(12) United States Patent
Kundel

(10) Patent No.: US 7,382,106 B2
(45) Date of Patent: Jun. 3, 2008

(54) METHOD TO OPERATE A MOTOR HAVING RECIPROCATING AND ROTATING PERMANENT MAGNETS

(76) Inventor: Stephen Kundel, 988 Henn Hyde Rd., Warren, OH (US) 44484

(*) Notice: Subject to any disclaimer, the term of this patent is extended or adjusted under 35 U.S.C. 154(b) by 6 days.

(21) Appl. No.: 11/479,612

(22) Filed: Jun. 30, 2006

(65) Prior Publication Data
US 2006/0267418 A1 Nov. 30, 2006

Related U.S. Application Data

(62) Division of application No. 11/116,006, filed on Apr. 27, 2005, now Pat. No. 7,151,332.

(51) Int. Cl.
*H02K 1/00* (2006.01)
(52) U.S. Cl. .......................... 318/538; 310/80; 310/15
(58) Field of Classification Search ................ 318/538; 310/80, 15, 49 R, 103, 20
See application file for complete search history.

(56) References Cited

U.S. PATENT DOCUMENTS

| | | | |
|---|---|---|---|
| 561,144 A | 6/1896 | Trudeau | |
| 1,724,446 A | 8/1929 | Worthington | |
| 2,790,095 A | 4/1957 | Peek et al. | |
| 3,469,130 A | 9/1969 | Jines et al. | |
| 3,703,653 A | 11/1972 | Tracy | |
| 3,811,058 A | 5/1974 | Kiniski | |
| 3,879,622 A | 4/1975 | Ecklin | |
| 3,890,548 A | 6/1975 | Gray | |
| 3,899,703 A | 8/1975 | Kinnison | |
| 3,967,146 A | 6/1976 | Howard | |
| 3,992,132 A | 11/1976 | Putt | |
| 4,011,477 A | 3/1977 | Scholin | |
| 4,151,431 A | 4/1979 | Johnson | |
| 4,179,633 A | 12/1979 | Kelly | |
| 4,196,365 A | 4/1980 | Presley | |
| 4,267,647 A | 5/1981 | Anderson, Jr. et al. | |
| 4,629,921 A | 12/1986 | Gavaletz | |
| 4,751,486 A | 6/1988 | Minato | |
| 5,402,021 A | 3/1995 | Johnson | |
| 5,594,289 A | 1/1997 | Minato | |
| 5,634,390 A | 6/1997 | Takeuchi et al. | |
| 5,751,083 A | 5/1998 | Tamura et al. | |
| 5,925,958 A | 7/1999 | Pirc | |
| 6,169,343 B1 | 1/2001 | Rich, Sr. | |
| 6,343,419 B1 | 2/2002 | Litman et al. | |
| 6,841,909 B2 | 1/2005 | Six | |
| 2002/0167236 A1 | 11/2002 | Long | |
| 2004/0124719 A1* | 7/2004 | Aoshima et al. | 310/49 R |
| 2004/0140722 A1 | 7/2004 | Long | |

FOREIGN PATENT DOCUMENTS

| | | |
|---|---|---|
| DE | 19850314 A1 | 5/2000 |
| WO | WO 2101908 A1 | 12/2002 |

* cited by examiner

*Primary Examiner*—Karen Masih
(74) *Attorney, Agent, or Firm*—Robert J. Herberger

(57) ABSTRACT

A method to operate a motor having a rotor supported for rotation about an axis, at least one pair of rotor magnets spaced angularly about the axis and supported on the rotor, at least one reciprocating magnet. The method includes the steps of moving the reciprocating magnet cyclically toward and away from the pair of rotor magnets, and consequently rotating the rotor magnets relative to the reciprocating magnet, or vice versa.

10 Claims, 11 Drawing Sheets

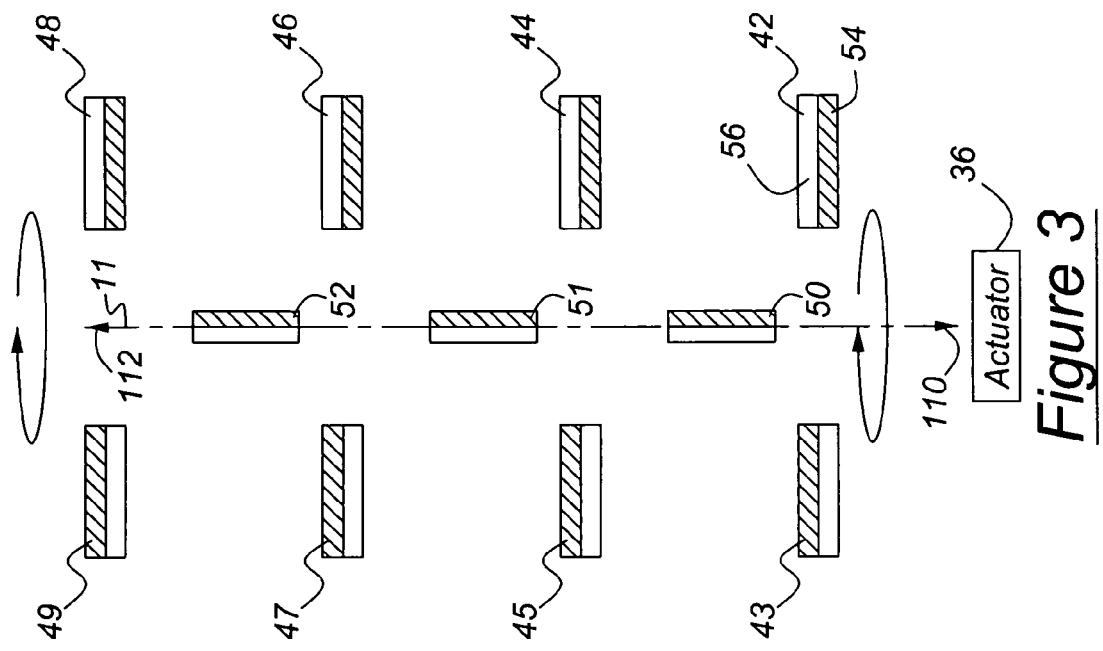
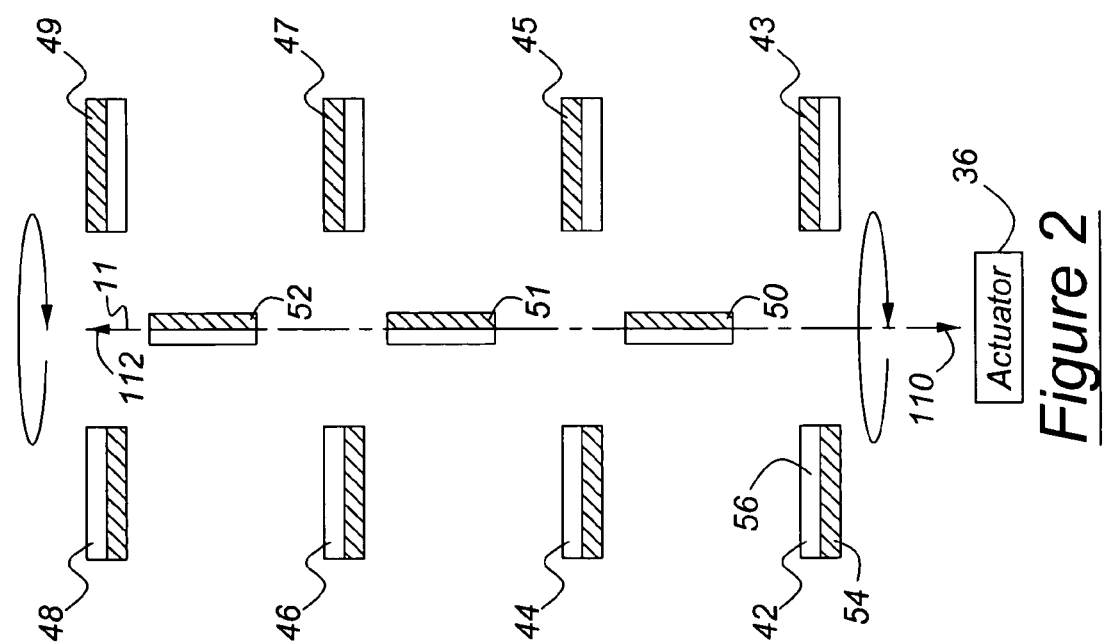

METHOD TO OPERATE A MOTOR HAVING RECIPROCATING AND ROTATING PERMANENT MAGNETS

CROSS-REFERENCED TO RELATED APPLICATION

This application is a divisional of the U.S. patent application Ser. No. 11/116,006, filed Apr. 27, 2005, now issued as U.S. Pat. No. 7,151,332, which is also the parent of a co-pending continuation-in-part application filed Jan. 19, 2006, identified as U.S. patent application Ser. No. 11/335,458.

BACKGROUND OF THE INVENTION

This invention relates to the field of motors. More particularly, it pertains to a motor whose rotor is driven by the mutual attraction and repulsion of permanent magnets located on the rotor and an oscillator.

Various kinds of motors are used to drive a load. For example, hydraulic and pneumatic motors use the flow of pressurized liquid and gas, respectively, to drive a rotor connected to a load. Such motors must be continually supplied with pressurized fluid from a pump driven by energy converted to rotating power by a prime mover, such as an internal combustion engine. The several energy conversion processes, flow losses and pumping losses decrease the operating efficiency of motor systems of this type.

Conventional electric motors employ the force applied to a current carrying conductor placed in a magnetic field. In a d. c. motor the magnetic field is provided either by permanent magnets or by field coils wrapped around clearly defined field poles on a stator. The conductors on which the force is developed are located on a rotor and supplied with electric current. The force induced in the coil is used to apply rotor torque, whose magnitude varies with the magnitude of the current and strength of the magnetic field. However, flux leakage, air gaps, temperature effects, and the counter-electromotive force reduce the efficiency of the motor.

Permanent dipole magnets have a magnetic north pole, a magnetic south pole, and magnetic fields surrounding each pole. Each magnetic pole attracts a pole of opposite magnetic polarity. Two magnetic poles of the same polarity repel each other. It is desired that a motor be developed such that its rotor is driven by the mutual attraction and repulsion of the poles of permanent magnets.

SUMMARY OF THE INVENTION

A motor according to the present invention includes a rotor supported for rotation about an axis, a first pair of rotor magnets including first and second rotor magnets spaced angularly about the axis and supported on the rotor, a reciprocating magnet, and an actuator for moving the reciprocating magnet cyclically toward and away from the first pair of rotor magnets, and cyclically rotating the first pair of rotor magnets relative to the reciprocating magnet. Preferably the motor includes a second pair of rotor magnets supported on the rotor, spaced axially from the first pair of rotor magnets, the second pair including a third rotor magnet and a fourth rotor magnet spaced angularly about the axis from the third rotor magnet. The reciprocating magnet is located axially between the first and second rotor magnet pairs, and the actuator cyclically moves the reciprocating magnet toward and away from the first and second pairs of rotor magnets.

The magnets are preferably permanent dipole magnets. The poles of the reciprocating magnet are arranged such that they face in opposite lateral directions.

The motor can be started by manually rotating the rotor about its axis. Rotation continues by using the actuator to move the reciprocating magnet toward the first rotor magnet pair and away from the second rotor magnet pair when rotor rotation brings the reference pole of the first rotor magnet closer to the opposite pole of the reciprocating magnet, and the opposite pole of the second rotor magnet closer to the reference pole of the reciprocating magnet. Then the actuator moves the reciprocating magnet toward the second rotor magnet pair and away from the first rotor magnet pair when rotor rotation brings the reference pole of the third rotor magnet closer to the opposite pole of the reciprocating magnet, and the opposite pole of the fourth rotor magnet closer to the reference pole of the reciprocating magnet.

A motor according to this invention requires no power source to energize a field coil because the magnetic fields of the rotor and oscillator are produced by permanent magnets. A nine-volt d. c. battery has been applied to an actuator switching mechanism to alternate the polarity of a solenoid at the rotor frequency. The solenoid is suspended over a permanent magnet of the actuator mechanism such that rotor rotation and the alternating polarity of a solenoid causes the actuator to oscillate the reciprocating magnet at a frequency and phase relation that is most efficient relative to the rotor rotation.

The motor is lightweight and portable, and requires only a commercially available portable d. c. battery to power an actuator for the oscillator. No motor drive electronics is required. Operation of the motor is practically silent.

Various objects and advantages of this invention will become apparent to those skilled in the art from the following detailed description of the preferred embodiment, when read in light of the accompanying drawings.

BRIEF DESCRIPTION OF THE DRAWINGS

These and other advantages of the present invention will become apparent to those skilled in the art from the following detailed description of a preferred embodiment when considered in the light of the accompanying drawings in which:

FIG. 2 is a top view of the of motor of FIGS. 1A and 1B showing the rotor magnets disposed horizontally and the reciprocating magnets located near one end of their range of travel;

FIG. 3 is a top view of the motor of FIG. 2 showing the rotor magnets rotated one-half revolution from the position shown in FIG. 2, and the reciprocating magnets located near the opposite end of their range of travel;

DETAILED DESCRIPTION OF THE PREFERRED EMBODIMENT

Figure 1A:
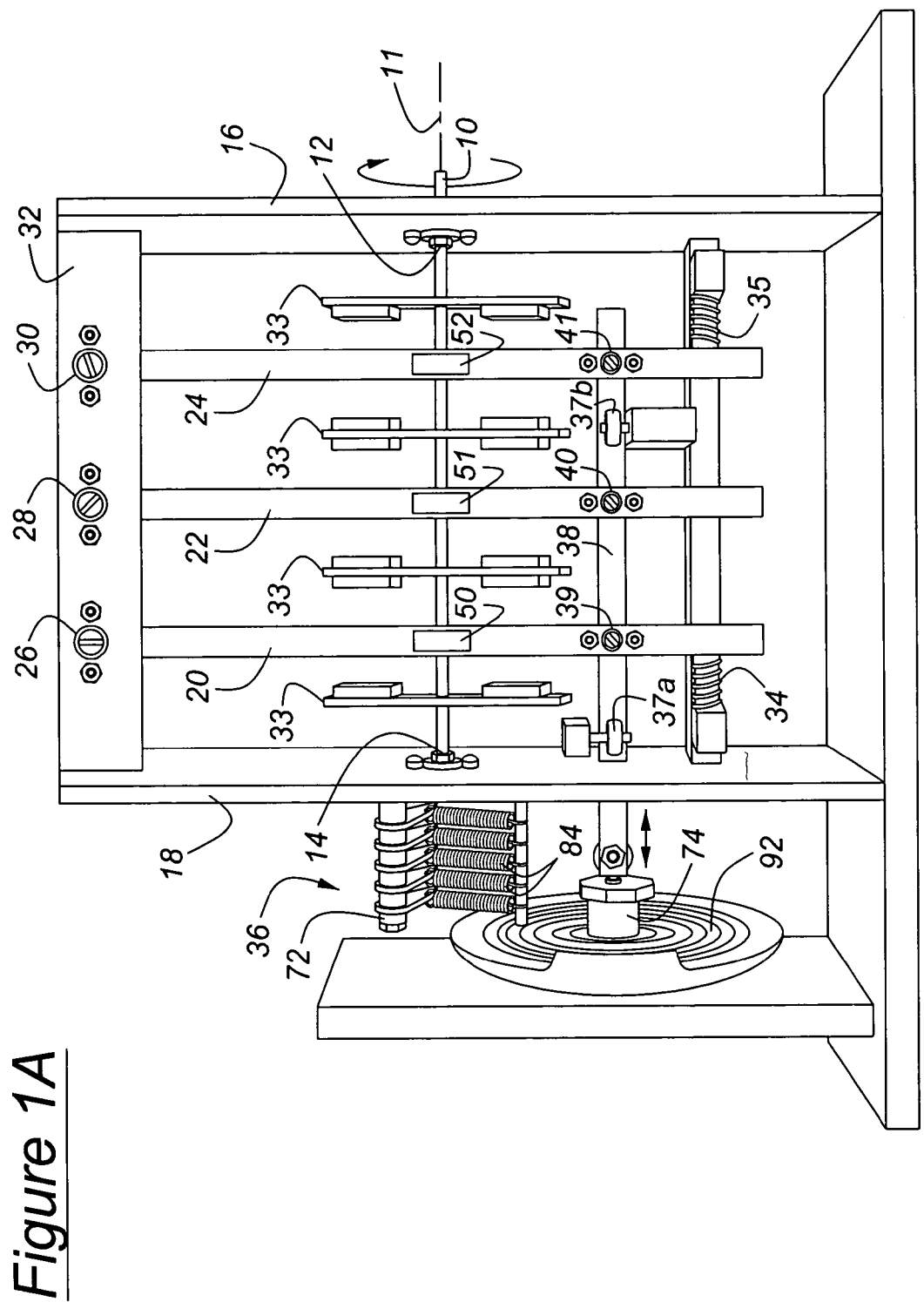
FIG. 1A is a side view of a motor according to this invention.
Figure 1B:
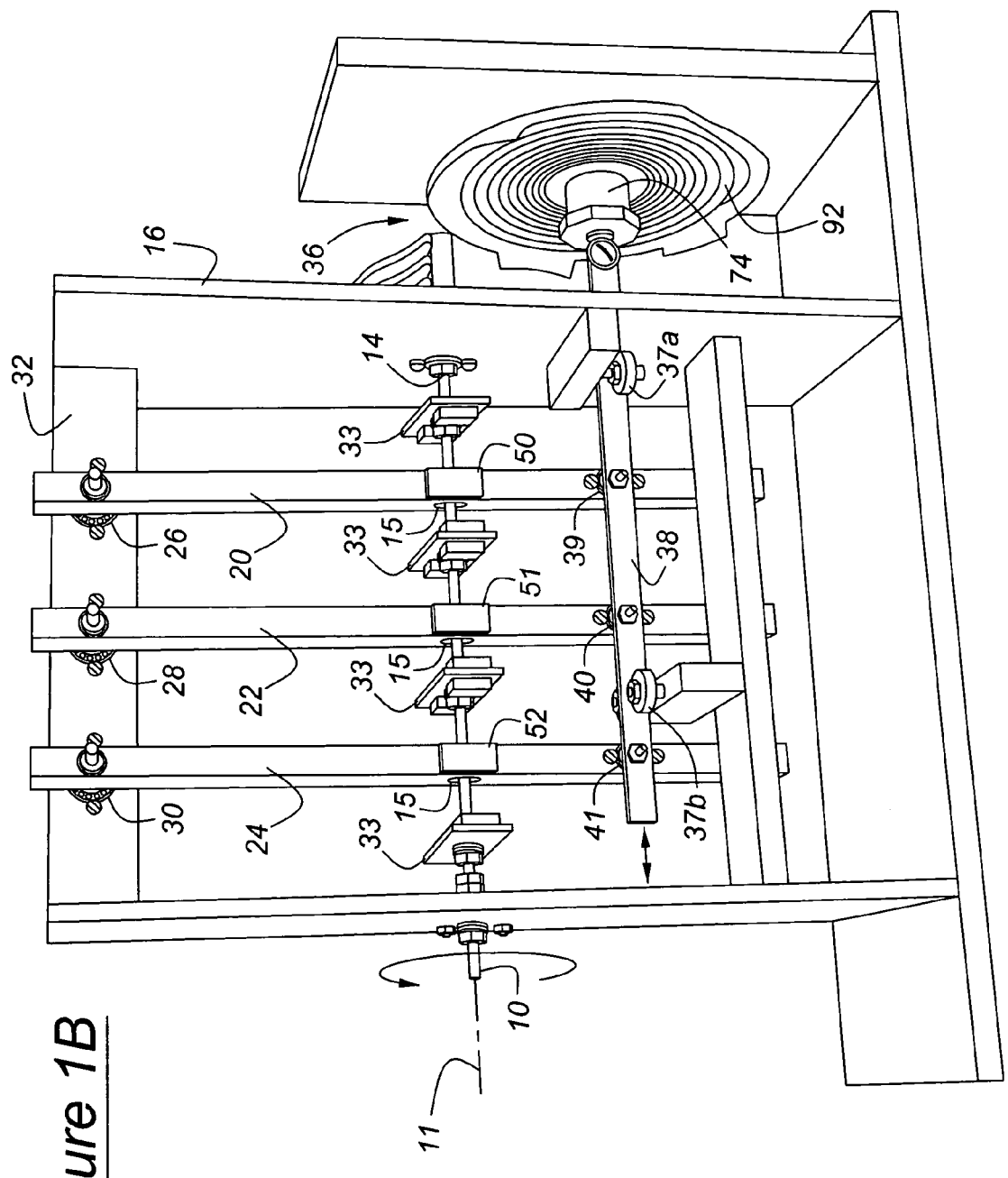
FIG. 1B is a perspective view of the motor of FIG. 1A.

A motor according to this invention, illustrated in FIGS. 1A and 1B includes a rotor shaft 10 supported for rotation about axis 11 on bearings 12, 14 located on vertical supports 16, 18 of a frame. An oscillator mechanism includes oscillator arms 20, 22, 24 pivotally supported on bearings 26, 28, 30, respectively, secured to a horizontal support 32, which is secured at each axial end to the vertical supports 16, 18. The oscillator arms 20, 22, 24 are formed with through holes 15 aligned with the axis 11 of rotor shaft 10, the holes permitting rotation of the rotor shaft and pivoting oscillation of arms without producing interference between the rotor and the arms.

Extending in opposite diametric directions from the rotor axis 11 and secured to the rotor shaft 10 are four plates 33, axially spaced mutually along the rotor axis, each plate supporting permanent magnets secured to the plate and rotating with the rotor shaft. Each pivoting oscillator arm 20, 22, 24 of the oscillator mechanism support permanent magnets located between the magnets of the rotor shaft. Helical coiled compression return springs 34, 35 apply oppositely directed forces to oscillator arms 20 and 24 as they pivot about their respective pivotal supports 26, 30, respectively. Relative to the point of view of FIGS. 1A and 1B, when spring 34 is compressed by displacement of oscillator arm, the spring applies a rightward force to oscillator arm 20 tending to return it to its neutral, undisplaced position. When spring 35 is compressed by displacement of arm 24, the spring applies a leftward force to arm 24 tending to return it to its neutral position.

The oscillator arms 20, 22, 24 oscillate about their supported bearings 26, 28, 30, as they move in response to an actuator 36, which includes an actuator arm 38, secured through bearings at 39, 40, 41 to the oscillator arms 20, 22, 24, respectively. Actuator 36 causes actuator arm 38 to reciprocate linearly leftward and rightward from the position shown in FIGS. 1A and 1B. The bearings 39, 40, 41 allow the oscillator arms 20, 22, 24 to pivot and the strut to translate without mutual interference. Pairs of guide wheels 37a, 37b spaced along actuator arm 38, each include a wheel located on an opposite side of actuator arm 38 from another wheel of the wheel-pair, for guiding linear movement of the strut and maintaining the oscillator arms 20, 22, 24 substantially in a vertical plane as they oscillate. Alternatively, the oscillator arms 20, 22, 24 may be replaced by a mechanism that allows the magnets on the oscillator arms to reciprocate linearly with actuator arm 38 instead of pivoting above the rotor shaft 10 at 26, 28, 30.

FIG. 2 shows a first arrangement of the permanent rotor magnets 42-49 that rotate about axis 11 and are secured to the rotor shaft 10, and the permanent reciprocating magnets 50-52 that move along axis 11 and are secured to the oscillating arms 20, 22, 24. Each magnet has a pole of reference polarity and a pole of opposite polarity from that of the reference polarity. For example, rotor magnets 42, 44, 46, 48, located on one side of axis 11, each have a north, positive or reference pole 54 facing actuator 36 and a south, negative or opposite pole 56 facing away from the actuator. Similarly rotation magnets 43, 45, 47, 49, located diametrically opposite from rotor magnets 42, 44, 46, 48, each have a south pole facing toward actuator 36 and a north pole facing away from the actuator. The north poles 54 of the reciprocating magnets 50-52 face rightward relative to the point of view shown in FIGS. 2 and 3. Their south poles 56 face leftward.

Figure 4:
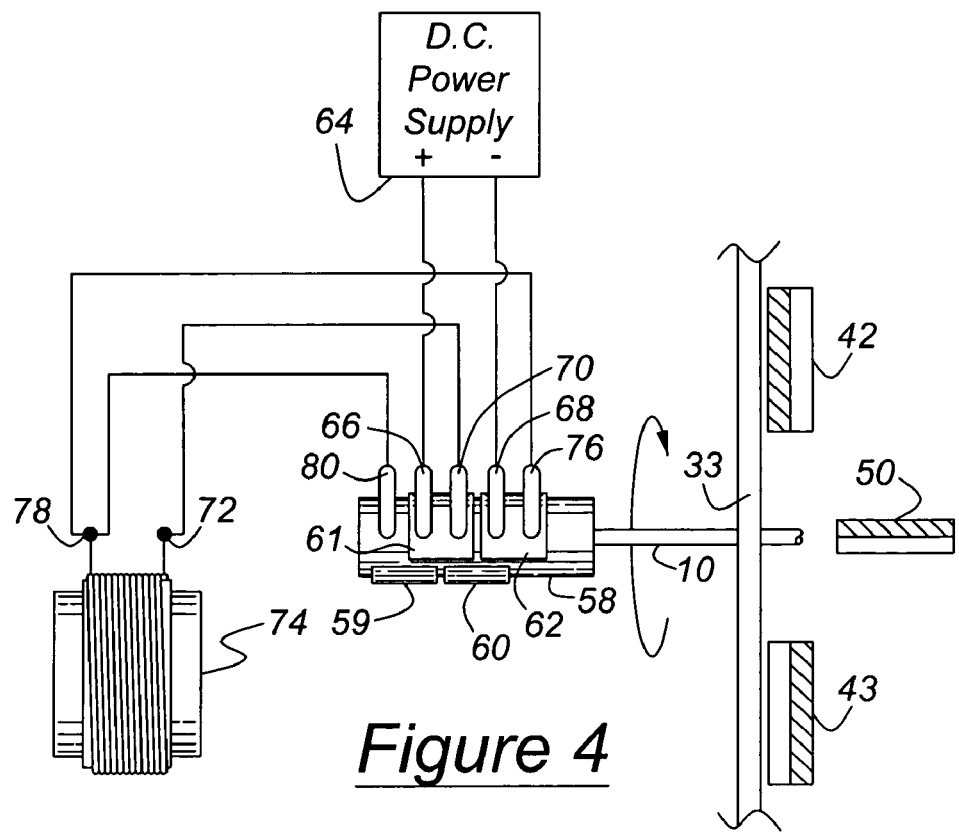
FIG. 4 is a schematic diagram of a first state of the actuator switching assembly of the motor of FIG. 1.
Figure 5:
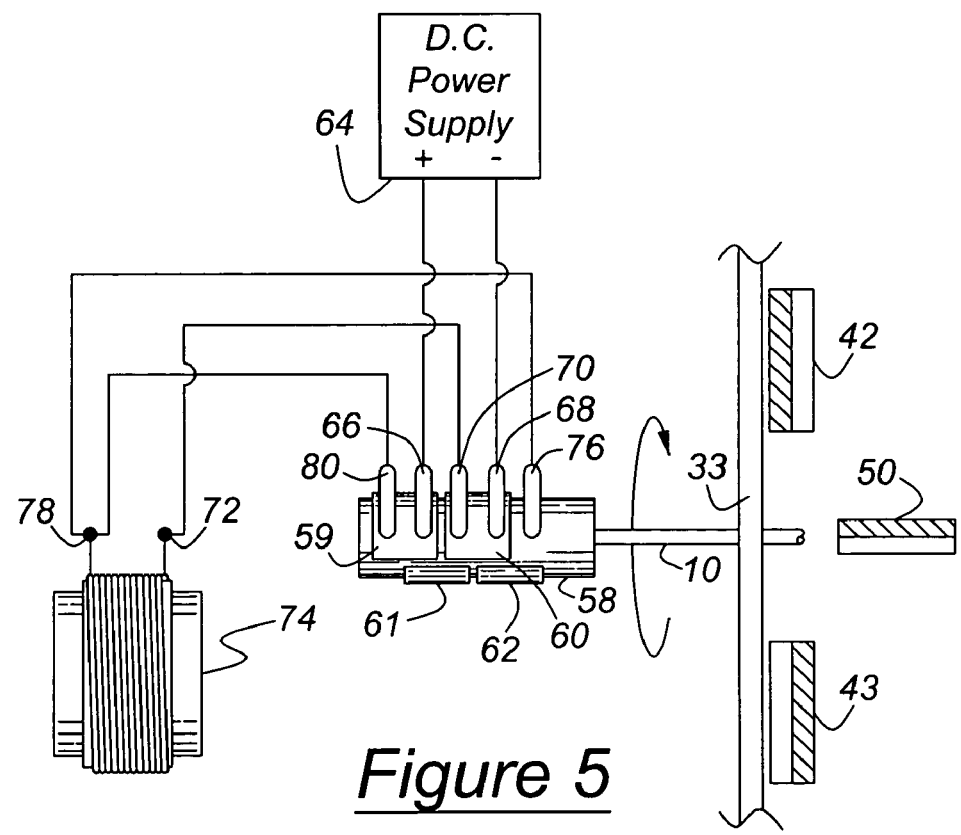
FIG. 5 is a schematic diagram of a second state of the actuator switching assembly of the motor of FIG. 1.

FIG. 4 shows a switch assembly located in the region of the left-hand end of rotor shaft 10. A cylinder 58, preferably formed of PVC is secured to rotor shaft 10. Cylinder 58 has contact plates 59, 60, preferably of brass, located on its outer surface, aligned angularly, and extending approximately 180 degrees about the axis 11, as shown in FIG. 5. Cylinder 58 has contact plates 61, 62, preferably of brass, located on its outer surface, aligned angularly, extending approximately 180 degrees about the axis 11, and offset axially with respect to contact plates 59, 60.

A d. c. power supply 64 has its positive and negative terminals connected electrically by contact fingers 66, 68 to contact plates 61, 62, respectively. A third contact finger 70, shown contacting plate 61, electrically connects terminal 72 of a solenoid 74 to the positive terminal of the power supply 64 through contact finger 66 and contact plate 61. A fourth contact finger 76, shown contacting plate 62, electrically connects terminal 78 of solenoid 74 to the negative terminal of the power supply 64 through contact finger 68 and contact plate 62. A fifth contact finger 80, axially aligned with contact plate 59 and offset axially from contact plate 61, is also connected to terminal 78 of solenoid 74.

Preferably the d. c. power supply 64 is a nine volt battery, or a d. c. power adaptor, whose input may be a conventional 120 volt, 60 Hz power source. The d. c. power supply and switching mechanism described with reference to FIGS. 4-7, may be replaced by an a. c. power source connected directly across the terminals 72, 78 of solenoid 74. As the input current cycles, the polarity of solenoid 74 alternates, the actuator arm 38 moves relative to a toroidal permanent magnet 90 (shown in FIG. 8), and the reciprocating magnets 50-52 reciprocate on the oscillating arms 20, 22, 24 which are driven by the actuator arm 38.

FIG. 5 shows the state of the switch assembly when rotor shaft 10 has rotated approximately 180 degrees from the position shown in FIG. 4. When the switch assembly is in the state shown in FIG. 5, d. c. power supply 64 has its positive and negative terminals electrically connected by contact fingers 66, 68 to contact plates 59, 60, respectively. Contact finger 70, shown contacting plate 60, electrically connects terminal 72 of solenoid 74 to the negative terminal of the power supply 64 through contact finger 68 and contact plate 60. Contact finger 80, shown contacting plate 59, electrically connects terminal 78 of solenoid 74 to the positive terminal through contact finger 66 and contact plate 59. Contact finger 76, axially aligned with contact plate 62 and offset axially from contact plate 60, remains connected to terminal 78 of solenoid 74. In this way, the polarity of the solenoid 74 changes cyclically as the rotor 10 rotates through each one-half revolution.

Figure 6:
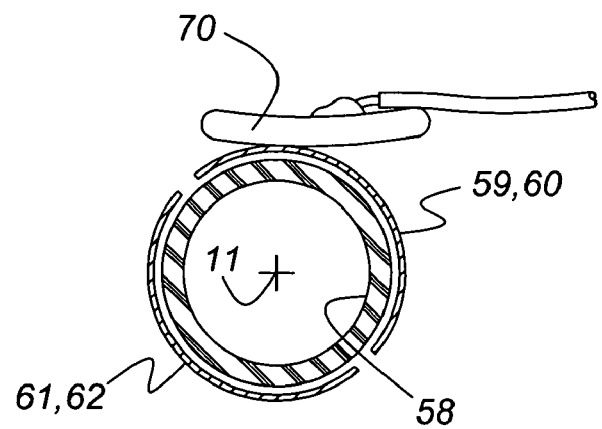
FIG. 6 is cross sectional view of a sleeve shaft aligned with the rotor shaft showing a contact finger and bridge contact plates of the switching assembly.

FIG. 6 shows in cross section the cylinder 58 driveably engaged and aligned with the rotor shaft 10, a contact finger 70, and the contact plates 59-62 of the switching assembly, which rotate with the rotor shaft and cylinder about the axis 11.

Figure 7:
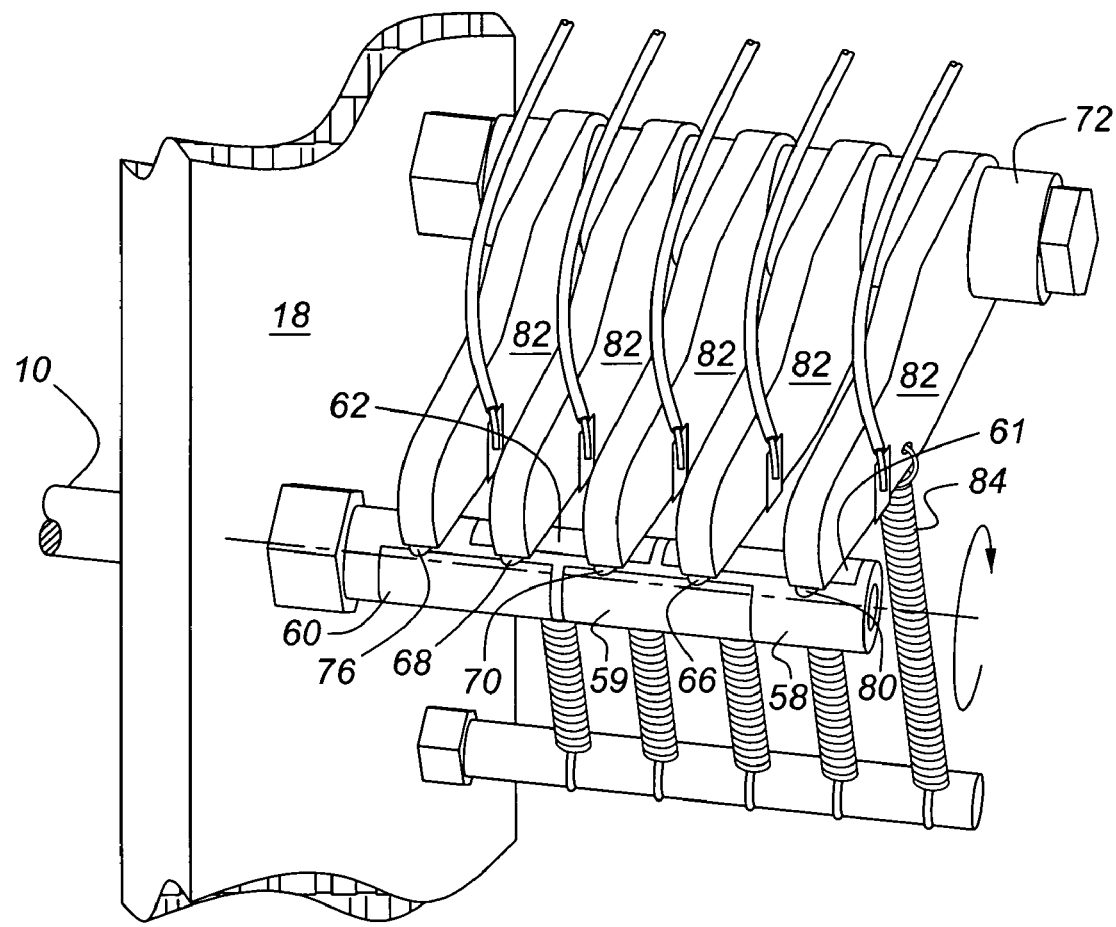
FIG. 7 is an isometric view showing the switching contact fingers secured on pivoting arms and seated on the bridge connectors of the switching assembly.

As FIG. 7 illustrates, axially spaced arms 82 are supported on a stub shaft 71, preferably of Teflon or another lubricious material to facilitate the arms' pivoting about the axis of the shaft 71. Each contact finger 66, 68, 70 76, 80 is located at the end of a arm 82, and tension springs 84, secured to each arm 82, urge the contact fingers 66, 68, 70, 76, 80 continually toward engagement with the contact plates 59-62.

Figure 8:
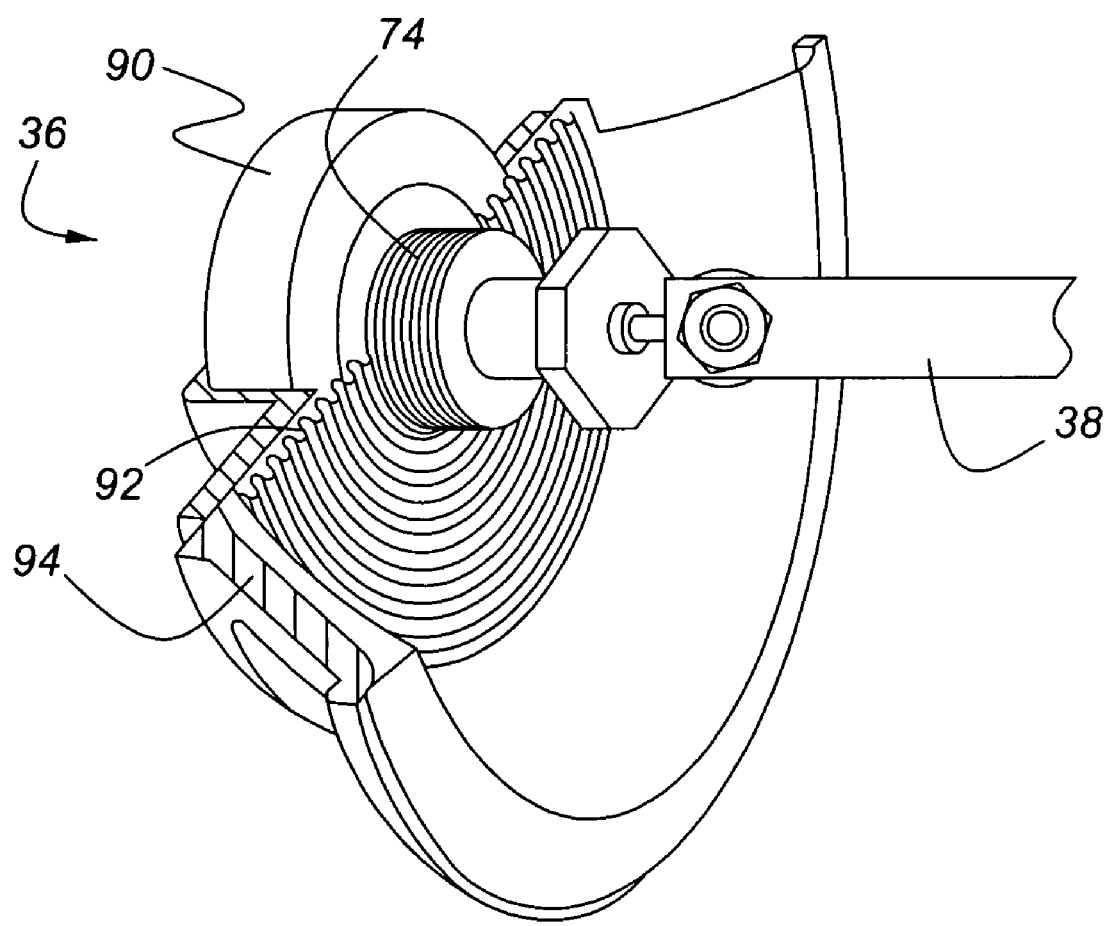
FIG. 8 is isometric cross sectional view showing a driver that includes a solenoid and permanent magnet for oscillating the actuator arm in response to rotation of the rotor shaft.

FIG. 8 illustrates the actuator 36 for reciprocating the actuator arm 38 in response to rotation of the rotor shaft 10 and the alternating polarity of the solenoid 74. The actuator 36 includes the solenoid 74, the toroidal permanent magnet 90, an elastically flexural spider 92 for supporting the solenoid above the plane of the magnet, and a basket or frame 94, to which the spider is secured. The actuator arm 38 is secured to solenoid 74. The polarity of the solenoid 74 changes as rotor shaft 10 rotates, causing the solenoid and actuator arm 38 to reciprocate due to the alternating polarity of the solenoid relative to that of the toroidal permanent magnet 90. As the solenoid polarity changes, the actuator arm 38 reciprocates linearly due to the alternating forces of attraction and repulsion of the solenoid 74 relative to the poles of the magnet 90. The actuator arm 38 is secured to the oscillator arms 20, 22, 24 causing them to pivot, and the reciprocating magnets 50-52 secured to the oscillator arms to reciprocate. Alternatively, the reciprocating magnets 50-52 can be secured directly to the arm 38, so that the magnets 50-52 reciprocate without need for an intermediary oscillating component.

It is important to note at this point in the description that, when two magnets approach each other with their poles of like polarity facing each other but slightly offset, there is a tendency for the magnets to rotate to the opposite pole of the other magnet. Therefore, in the preferred embodiment of the instant invention, the angular position at which the switch assembly of the actuator 36 changes between the states of FIGS. 4 and 5 is slightly out of phase with the angular position of the rotor shaft 10 to help sling or propel the actuator arm 38 in the reverse direction at the preferred position of the rotor shaft. The optimum phase offset is approximately 5-8 degrees. This way, advantage is taken of each rotor magnet's tendency to rotate about its own magnetic field when slightly offset from the respective reciprocating magnet, and the repulsive force between like poles of the reciprocating magnets and the rotor magnets is optimized to propel the rotor magnet about the rotor axis 11, thereby increasing the motor's overall efficiency.

Figure 12:
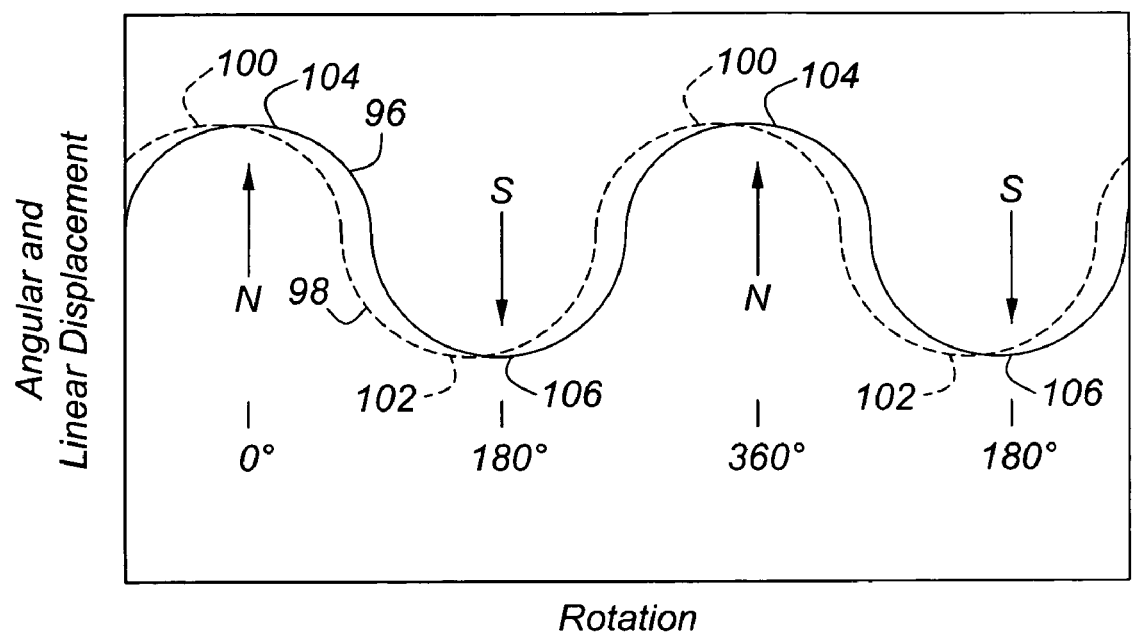
FIG. 12 is a graph showing the angular displacement of the rotor shaft 10 and linear displacement of the reciprocating magnets.

FIG. 12 is a graph showing the angular displacement 96 of the rotor shaft 10 and linear displacement 98 of the reciprocating magnets 50-52. Point 100 represents the to end of the range of displacement of the reciprocating magnets 50-52 shown in FIGS. 2 and 9, and point 102 represents the opposite end of the range of displacement of the reciprocating magnets 50-52 shown in FIGS. 3 and 10. Point 104 represents the angular position of the rotor magnets 42-49 when in the horizontal plane shown in FIGS. 2 and 9, and point 106 represents the angular position of the rotor magnets 42-49 when rotated one-half rotation to the horizontal plane shown in FIGS. 3 and 10. Preferably, the reciprocating magnets 50-52 and rotor magnets 42-49 are out of phase: the reciprocating magnets lead and the rotor magnets lag by several degrees. The reciprocating magnets 50-52 reach the respective extremities of their range of travel before rotor rotation moves the rotor magnets 42-49 into the horizontal plane.

When the reference poles 54 and opposite poles 56 of the rotor magnets 42-49 and reciprocating magnets 50-52 are arranged as shown in FIGS. 2 and 3, the rotor position is stable when the rotor magnets are in a horizontal plane. The rotor position is unstable in any other angular position, moves toward horizontal stability from any unstable position, and is least stable when the rotor magnets 42-49 are in a vertical plane. The degree of stability of the rotor shaft 10 is a consequence of the mutual attraction and repulsion of the poles of the rotor magnets 42-49 and reciprocating magnets 50-52 and the relative proximity among the poles. In FIG. 2, the reciprocating magnets 50-52 are located at a first extremity of travel. In FIG. 3, the reciprocating magnets 50-52 have reciprocated to the opposite extremity of travel, and the rotor magnets have rotated one-half revolution from the position shown in FIG. 2.

When the rotor is stopped, its rotation can be easily started manually by applying torque in either direction. Actuator 36 sustains rotor rotation after it is connecting to its power source. Rotation of rotor shaft 10 about axis 11 is aided by cyclic movement of the reciprocating magnets 50-52, their axial location between the rotor magnet pairs 42-43, 44-45, 46-47, 48-49, the disposition of their poles in relation to the poles of the rotor magnets, and the frequency and phase relationship of their reciprocation relative to rotation of the rotor magnets. Actuator 36 maintains the rotor 10 rotating and actuator arm 38 oscillating at the same frequency, the phase relationship being as described with reference to FIG. 12.

With the rotor magnets 42, 49 as shown in FIG. 2, when viewed from above, the north poles 54 of the rotor magnets on the left-hand side of axis 11 face a first axial direction 110, i.e., toward the actuator 36, and the north poles 54 of the rotor magnets on the right-hand side of axis 11 face in the opposite axial direction 112, away from actuator 36. When the rotor magnets 42-49 are located as in FIG. 2, the north poles 54 of reciprocating magnets 50-52 are adjacent the south poles 56 of rotor magnets 45, 47, 49, and the south poles 56 of reciprocating magnets 50-52 are adjacent the north poles 54 of rotor magnets 44, 46, 48.

Furthermore, when the rotor shaft 10 rotates to the position shown in FIG. 2, the reciprocating magnets 50-52 are located at or near one extremity of their axial travel, such that the north poles 54 of reciprocating magnets 50-52 are located close to the south poles 56 of rotor magnets 45, 47, 49, respectively, and relatively more distant from the north poles 54 of rotor magnets 43, 45, 47, respectively. Similarly, the south poles 56 of reciprocating magnets 50-52 are located close to the north poles of rotor magnet 44, 46, 48, respectively, and relatively more distant from the south poles of rotor magnets 42, 44, 46, respectively.

With the rotor magnets 42, 49 rotated into a horizontal plane one-half revolution from the position of FIG. 1B, when viewed from above as shown in FIG. 3, the north poles 54 of reciprocating magnets 50-52 are located adjacent the south poles of rotor magnets 42, 44, 46, and the south poles 56 of reciprocating magnets 50-52 are located adjacent the north poles 54 of rotor magnets 43, 45, 47, respectively. When the rotor 10 shaft is located as shown in FIG. 3, the reciprocating magnets 50-52 are located at or near the opposite extremity of their axial travel from that of FIG. 2, such that the north poles 54 of reciprocating magnets 50-52 are located close to the south poles 56 of rotor magnet 42, 44, 46, respectively, and relatively more distant from the north poles of rotor magnets 44, 46, 48, respectively. Similarly, when the rotor shaft 10 is located as shown in FIG. 3, the south poles 56 of reciprocating magnets 50-52 are located close to the north poles of rotor magnet 43, 45, 47, respectively, and relatively more distant from the south poles of rotor magnets 45, 47, 49, respectively.

In operation, rotation of rotor shaft 10 in either angular direction is started manually or with a starter-actuator (not shown). Actuator 36 causes reciprocating magnets 50-52 to oscillate or reciprocate at the same frequency as the rotational frequency of the rotor shaft 10, i.e., one cycle of reciprocation per cycle of rotation, preferably with the phase relationship illustrated in FIG. 12. When the reciprocating magnets 50-52 are located as shown in FIG. 2, the rotor shaft 10 will have completed about one-half revolution from the position of FIG. 3 to the position of FIG. 2.

Rotation of the rotor 10 is aided by mutual attraction between the north poles 54 of reciprocating magnets 50-52 and the south poles 56 of the rotor magnets 43, 45, 47, 49 that are then closest respectively to those north poles of reciprocating magnets 50-52, and mutual attraction between the south poles of reciprocating magnets 50-52 and the north poles of the rotor magnets 42, 44, 46, 48 that are then closest respectively to the north poles of the reciprocating magnets.

Assume rotor shaft 10 is rotating counterclockwise when viewed from the actuator 36, and rotor magnets 42, 44, 46, 48 are located above rotor magnets 43, 45, 47, and 49. With the rotor shaft 10 so disposed, the reciprocating magnets 50-52 are approximately mid-way between the positions shown in FIG. 2 and 3 and moving toward the position shown in FIG. 2. As rotation proceeds, the south pole of each reciprocating magnet 50-52 attracts downward the north pole 54 of the closest rotor magnet 44, 46, 48, and the north pole 54 of each reciprocating magnet 50-52 attracts upward the south pole 56 of the closest rotor magnet 45, 47, 49. This mutual attraction of the poles causes the rotor to continue rotating counterclockwise to the position of FIG. 2.

Then the reciprocating magnets 50-52 begin to move toward the position shown in FIG. 3, and rotor inertia overcomes the steadily decreasing force of attraction between the poles as they move mutually apart, permitting the rotor shaft 10 to continue its counterclockwise rotation into the vertical plane where rotor magnets 43, 45, 47, 49 are located above rotor magnets 42, 44, 46, 48. As rotor shaft 10 rotates past the vertical plane, the reciprocating magnets 50-52 continue to move toward the position of FIG. 3, the south pole 56 of each reciprocating magnet 50-52 attracts downward the north pole of the closest rotor magnet 43, 45, 47, and the north pole 54 of each reciprocating magnet 50-52 attracts upward the south pole 56 of the closest rotor magnet 42, 44, 46, causing the rotor 10 to rotate counterclockwise to the position of FIG. 3. Rotor inertia maintains the counterclockwise rotation, the reciprocating magnets 50-52 begin to move toward the position shown in FIG. 2, and the rotor shaft 10 returns to the vertical plane where rotor magnets 43, 45, 47, 49 are located above rotor magnets 42, 44, 46, 48, thereby completing one full revolution.

Figure 10:
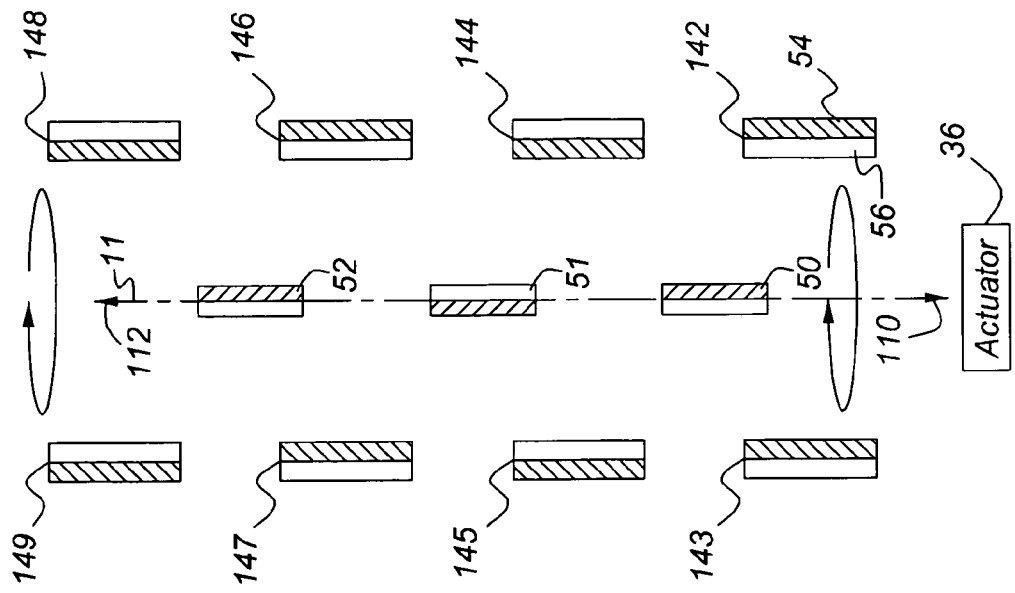
FIG. 10 is a top view showing the rotor magnet arrangement of FIG. 9 rotated one-half revolution from the position shown in FIG. 9, and the reciprocating magnets located near the opposite end of their range of displacement.
Figure 9:
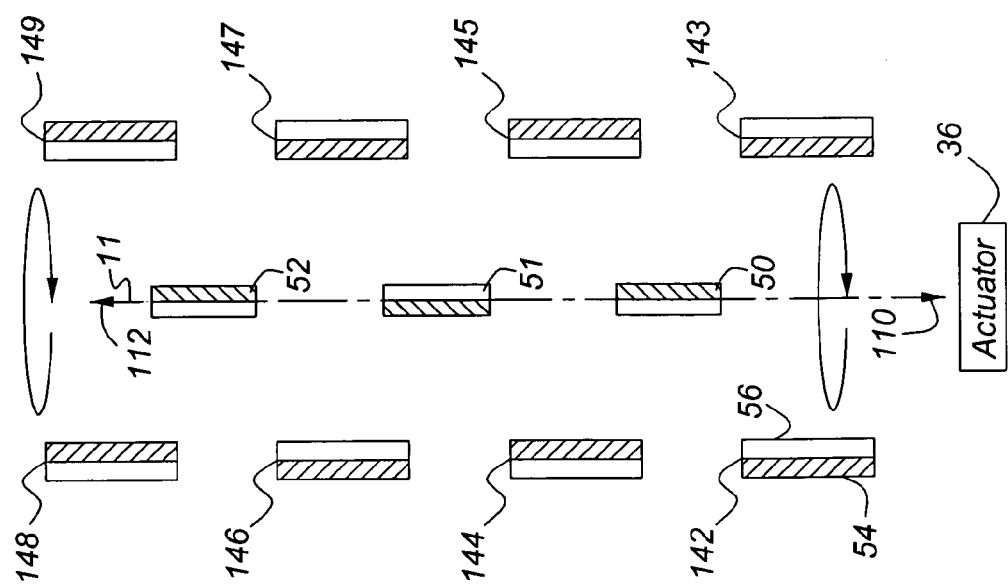
FIG. 9 is a top view of an alternate arrangement of the rotor magnets, wherein they are disposed horizontally and rotated ninety degrees from the position shown in FIG. 2, and the reciprocating magnets are located near an end of their range of displacement.

FIGS. 9 and 10 show a second arrangement of the motor in which the poles of the rotor magnets 142-149 are parallel to, and face the same direction as those of the reciprocating magnets 50-52. Operation of the motor arranged as shown in FIGS. 9 and 10 is identical to the operation described with reference to FIGS. 2 and 3. In the embodiment of FIGS. 9 and 10, the poles of the reciprocating magnets 50-52 face more directly the poles of the rotor magnets 142-149 in the arrangement of FIGS. 2 and 3. The forces of attraction and repulsion between the poles are greater in the embodiment of FIGS. 9 and 10; therefore, greater torque is developed. The magnitude of torque is a function of the magnitude of the magnetic forces, and the distance through which those force operate.

Figure 11:
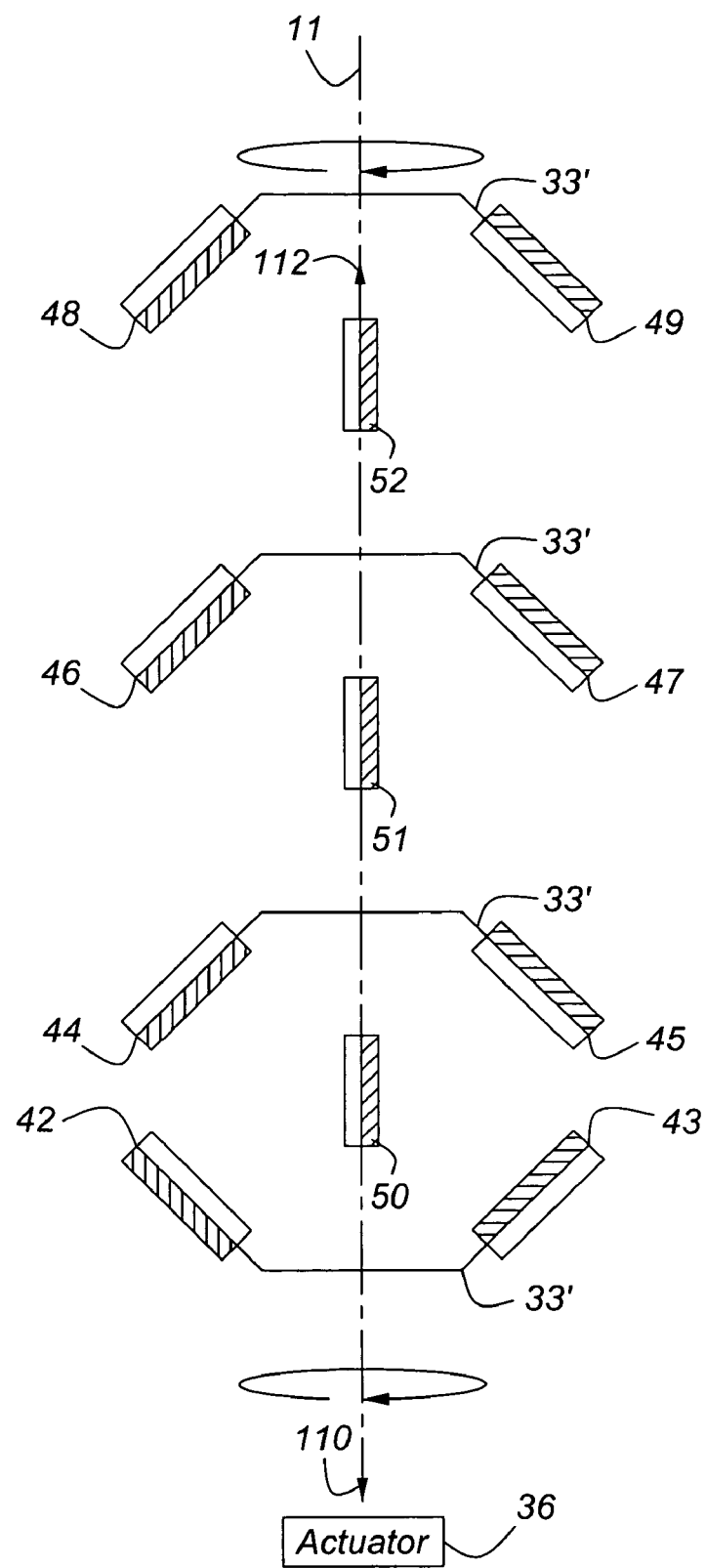
FIG. 11 is a top view of the motor showing a third arrangement of the rotor magnets, which are canted with respect to the axis and the reciprocating magnets.

FIG. 11 shows a third embodiment of the motor in which the radial outer portion of the rotor plates 33' are skewed relative to the axis 11 such that the poles of the rotor magnets 42-49 are canted relative to the poles of the reciprocating magnets 50-52. Operation of the motor arranged as shown in FIG. 11 is identical to the operation described with reference to FIGS. 2 and 3.

Figure 13:
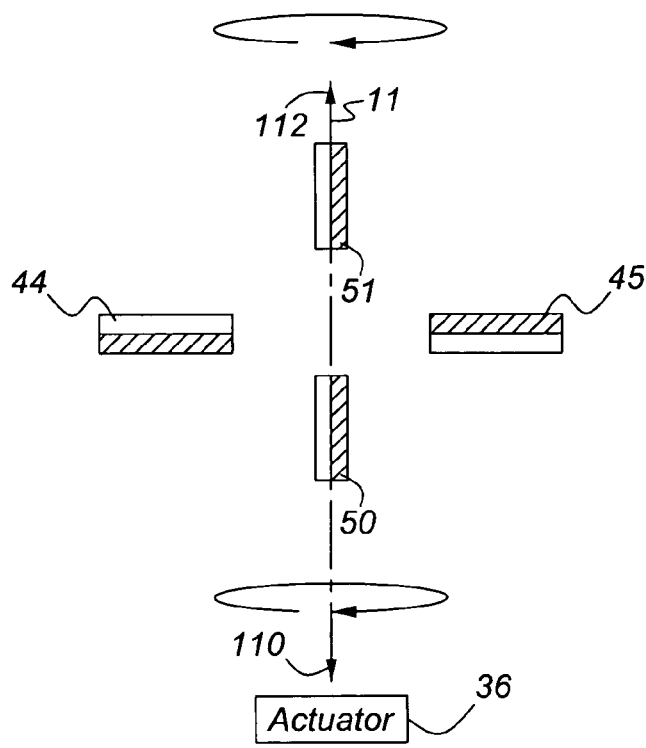
FIG. 13 is a top view of a pair of rotor magnets disposed horizontally and reciprocating magnets located near one end of their range of travel.
Figure 14:
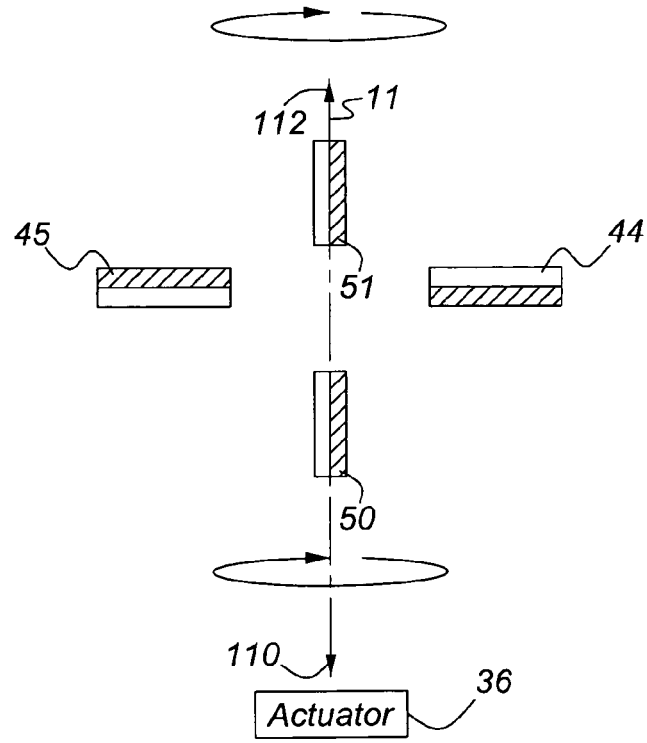
FIG. 14 is a top view of the motor of FIG. 13 showing the rotor magnets rotated one-half revolution from the position shown in FIG. 13, and the reciprocating magnets located near the opposite end of their range of travel.

FIGS. 13 and 14 show a fourth embodiment of the motor in which each of two reciprocating magnets 50, 51 is located on an axially opposite side of a rotor magnet pair 44, 45. Operation of the motor arranged as shown in FIGS. 13 and 14 is identical to the operation described with reference to FIGS. 2 and 3.

The direction of the rotational output can be in either angular direction depending on the direction of the starting torque.

The motor can produce reciprocating output on actuator arm 38 instead of the rotational output described above upon disconnecting actuator arm 38 from actuator 36, and connecting a crank, or a functionally similar device, in the drive path between the actuator and the rotor shaft 10. The crank converts rotation of the rotor shaft 10 to reciprocation of the actuator 30. In this case, the rotor shaft 10 is driven rotatably in either direction by the power source, and the output is taken on the reciprocating arm 38, which remains driveably connected to the oscillating arms 20, 22, 24. The reciprocating magnets 50, 51, 52 drive the oscillating arms 20, 22, 24.

Figure 15:
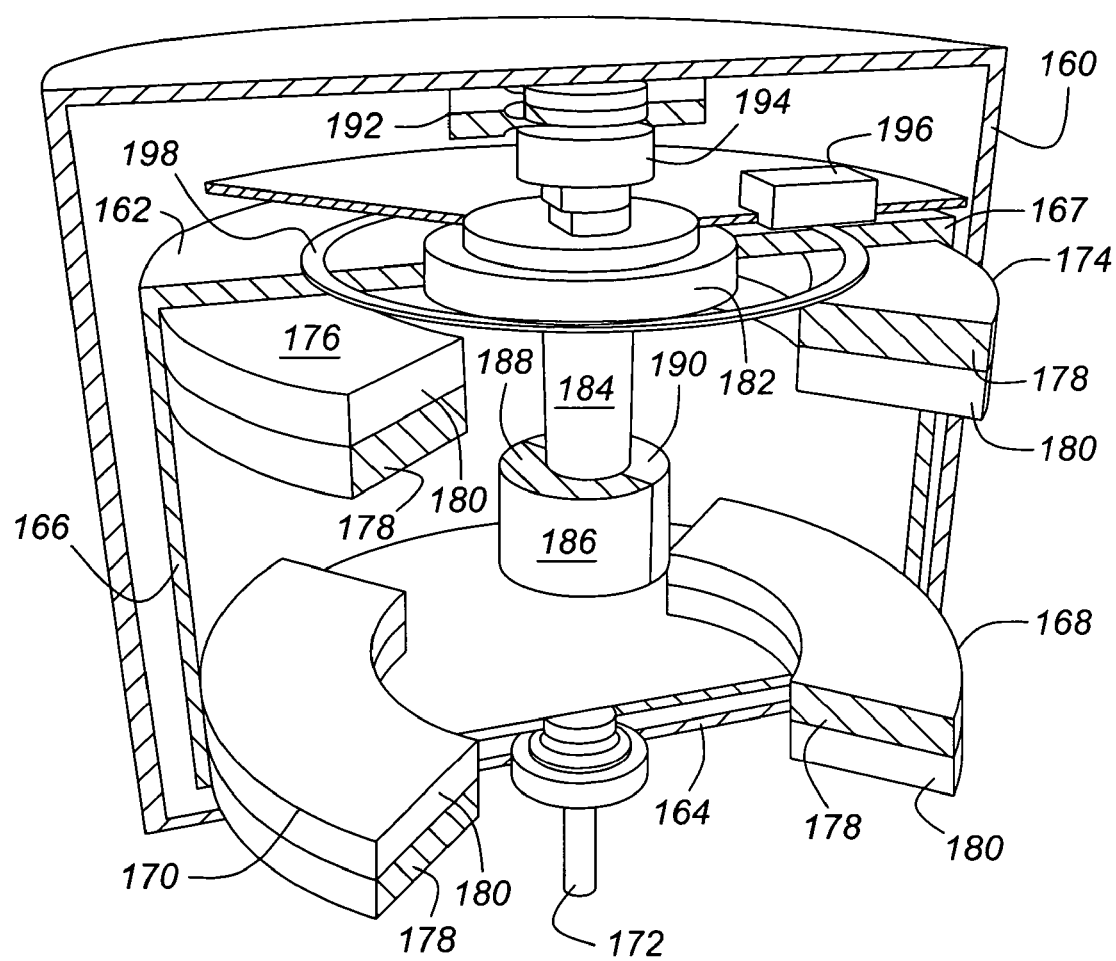
FIG. 15 is a perspective cross sectional view of yet another embodiment of the motor according to this invention.

In the perspective cross sectional view shown in FIG. 15, an outer casing 160 contains a motor according to this invention functioning essentially the same as the embodiment of the more efficient motor shown in FIGS. 1A and 1B, but having a commercial appearance. The rotor includes discs 162, 164, which are connected by an outer drum 166 of nonmagnetic material. The upper surface 167 of drum 166 forms a magnetic shield surrounding the rotor. Mounted on the lower disc 164 are arcuate rotor magnets 168, 170, which extend angularly about a rotor shaft 172, which is secured to the rotor. Mounted on the upper disc 162 are arcuate rotor magnets 174, 176, which extend angularly about the rotor shaft 172. The reference poles are 178, and the opposite poles are 180. A bushing 182 rotates with the rotor.

A reciprocating piston 184, which moves vertically but does not rotate, supports reciprocating magnet 186, whose reference pole 188 and opposite pole 190 extend angularly about the axis of piston 184.

A solenoid magnet 192, comparable to magnet 90 of the actuator 36 illustrated in FIG. 8, is located adjacent a solenoid 194, comparable to solenoid 74 of FIGS. 4 and 5. The polarity of solenoid 194 alternates as the rotor rotates. Simply stated, as a consequence of the alternating polarity of the solenoid 194, the reciprocating piston 184 reciprocates which, in turn, continues to more efficiently advance the rotor using the attraction and repulsion forces between the reciprocating magnets 186 and rotor magnets 168, 170, 174, 176 as described above and shown in any of the different embodiments using FIGS. 2-3, 9-10, 11 and 13-14. Of course, just as the alternating polarity of the solenoid can put the motor in motion, so can the turning of the rotor, as described above. A photosensor 196 and sensor ring 198 can be used, as an alternative to the mechanical embodiment described in FIGS. 4-7, to cooperatively determine the angular position of the rotor so as to alternate the polarity of the solenoid 194 with the rotor to correspond with the phase and cycle shown in FIG. 12.

In accordance with the provisions of the patent statutes, the present invention has been described in what is considered to represent its preferred embodiment. However, it should be noted that the invention can be practiced otherwise than as specifically illustrated and described without departing from its spirit or scope. It is intended that all such modifications and alterations be included insofar as they come within the scope of the appended claims or the equivalents thereof.

The invention claimed is:

1. A method for operating a motor that includes a rotor supported for rotation about an axis, a first pair of rotor magnets supported on the rotor and mutually spaced angularly about the axis such that the first pair of rotor magnets rotate about the axis along a path having an outermost circumferential perimeter, a second pair of rotor magnets supported on the rotor, mutually spaced angularly about the axis, and spaced axially from the first pair, each rotor magnet having a reference pole and an opposite pole, and a reciprocating magnet having a reference pole and an opposite pole, the method comprising the steps of:
   (a) rotating the rotor about the axis in one rotational direction at a rotor frequency; and
   (b) cyclically moving the reciprocating magnet toward and away from the first and second pairs of rotor magnets without passing the reciprocating magnet through a corresponding center of rotation for each of the first pair of rotor magnets and the second pair of rotor magnets, the reciprocating magnet being axially disposed in a first space within a boundary defined by longitudinally extending the outermost circumferential perimeter of the first pair of rotor magnets.

2. The method of claim 1 wherein step (b) further comprises moving the reciprocating magnet substantially along the axis.

3. The method of claim 1 further comprising the steps of:
   arranging the poles of the reciprocating magnet such that they face in opposite lateral directions; and
   moving the reciprocating magnet toward the first rotor magnet pair and away from the second rotor magnet pair when rotor rotation moves the reference pole of a first rotor magnet of the first rotor magnet pair toward the opposite pole of the reciprocating magnet, and moves the opposite pole of a second rotor magnet of the first rotor magnet pair toward the reference pole of the reciprocating magnet.

4. The method of claim 1 further comprising the steps of:
   arranging the poles of the reciprocating magnet such that they face in opposite lateral directions;
   moving the reciprocating magnet toward the first rotor magnet pair and away from the second rotor magnet pair when rotor rotation moves the reference pole of a first rotor magnet of the first rotor magnet pair toward the opposite pole of the reciprocating magnet, and moves the opposite pole of a second rotor magnet of the first rotor magnet pair toward the reference pole of the reciprocating magnet; and
   moving the reciprocating magnet toward the second rotor magnet pair and away from the first rotor magnet pair when rotor rotation moves the reference pole of a third rotor magnet of the second rotor magnet pair toward the opposite pole of the reciprocating magnet, and moves the opposite pole of a fourth rotor magnet of the second rotor magnet pair toward the reference pole of the reciprocating magnet.

5. The method of claim 2 further comprising the steps of:
   arranging the poles of the reciprocating magnet such that they face in opposite lateral directions;
   moving the reciprocating magnet toward the first rotor magnet pair and away from the second rotor magnet pair when rotor rotation moves the reference pole of a first rotor magnet of the first rotor magnet pair toward the opposite pole of the reciprocating magnet, and moves the opposite pole of a second rotor magnet of the first rotor magnet pair toward the reference pole of the reciprocating magnet; and
   moving the reciprocating magnet toward the second rotor magnet pair and away from the first rotor magnet pair when rotor rotation moves the reference pole of a third rotor magnet of the second rotor magnet pair toward the opposite pole of the reciprocating magnet, and moves the opposite pole of a fourth rotor magnet of the second rotor magnet pair toward the reference pole of the reciprocating magnet.

6. A method for operating a motor that includes a rotor supported for rotation about an axis, a first pair of rotor magnets supported on the rotor and mutually spaced angularly about the axis, a second pair of rotor magnets supported on the rotor and mutually spaced angularly about the axis, and the second pair of rotor magnets being spaced axially from the first pair of rotor magnets, each rotor magnet having a reference pole and an opposite pole, and a reciprocating magnet having a reference pole and an opposite pole, the method comprising the step of:
   causing the motor cyclically to move the reciprocating magnets toward and away from the first and second pairs of rotor magnets without passing the reciprocating magnet through a corresponding center of rotation for each of the first pair of rotor magnets and the second pair of rotor magnets by driving the rotor in rotation about the axis, the reciprocating magnet being axially disposed in a first space within a boundary defined by longitudinally extending the outermost circumferential perimeter of the first pair of rotor magnets.

7. The method of claim 6 wherein the reciprocating magnet moves substantially along the axis.

8. The method of claim 6 further comprising the steps of:
   arranging the poles of the reciprocating magnet such that they face in opposite lateral directions; and
   moving the reciprocating magnet toward the first rotor magnet pair and away from the second rotor magnet pair when rotor rotation moves the reference pole of a first rotor magnet of the first rotor magnet pair toward the opposite pole of the reciprocating magnet, and moves the opposite pole of a second rotor magnet of the first rotor magnet pair toward the reference pole of the reciprocating magnet.

9. The method of claim 6 further comprising the steps of:
   arranging the poles of the reciprocating magnet such that they face in opposite lateral directions;

moving the reciprocating magnet toward the first rotor magnet pair and away from the second rotor magnet pair when rotor rotation moves the reference pole of a first rotor magnet of the first rotor magnet pair toward the opposite pole of the reciprocating magnet, and moves the opposite pole of a second rotor magnet of the first rotor magnet pair toward the reference pole of the reciprocating magnet; and moving the reciprocating magnet toward the second rotor magnet pair and away from the first rotor magnet pair when rotor rotation moves the reference pole of a third rotor magnet of the second rotor magnet pair toward the opposite pole of the reciprocating magnet, and moves the opposite pole of a fourth rotor magnet of the second rotor magnet pair toward the reference pole of the reciprocating magnet.

10. The method of claim 8 further comprising the steps of:

arranging the poles of the reciprocating magnet such that they face in opposite lateral directions;

moving the reciprocating magnet toward the first rotor magnet pair and away from the second rotor magnet pair when rotor rotation moves the reference pole of a first rotor magnet of the first rotor magnet pair toward the opposite pole of the reciprocating magnet, and moves the opposite pole of a second rotor magnet of the first rotor magnet pair toward the reference pole of the reciprocating magnet; and moving the reciprocating magnet toward the second rotor magnet pair and away from the first rotor magnet pair when rotor rotation moves the reference pole of a third rotor magnet of the second rotor magnet pair toward the opposite pole of the reciprocating magnet, and moves the opposite pole of a fourth rotor magnet of the second rotor magnet pair toward the reference pole of the reciprocating magnet.

* * * * *